United States Patent
Ananth et al.

(10) Patent No.: US 12,373,761 B2
(45) Date of Patent: Jul. 29, 2025

(54) RESOURCE PARITY SCALING USING KEY PERFORMANCE INDICATOR METRICS

(71) Applicant: INTERNATIONAL BUSINESS MACHINES CORPORATION, Armonk, NY (US)

(72) Inventors: Rashmi Ananth, North Brunswick, NJ (US); Mary Bittar, Houston, TX (US); Rohit Chandran, Wilton, CT (US); Elisabeth Kjersten Vehling, San Jose, CA (US); Zachary A. Silverstein, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 18/153,893

(22) Filed: Jan. 12, 2023

(65) Prior Publication Data
US 2024/0242160 A1  Jul. 18, 2024

(51) Int. Cl.
G06Q 10/00 (2023.01)
G06Q 10/0639 (2023.01)
G06Q 10/105 (2023.01)

(52) U.S. Cl.
CPC ..... *G06Q 10/06393* (2013.01); *G06Q 10/105* (2013.01)

(58) Field of Classification Search
None
See application file for complete search history.

(56) References Cited

U.S. PATENT DOCUMENTS

| | | | |
|---|---|---|---|
| 6,978,374 B1 * | 12/2005 | Hansen | G06F 21/71 713/189 |
| 7,729,270 B2 | 6/2010 | Bishop et al. | |
| 8,538,787 B2 | 9/2013 | Braun et al. | |
| 9,336,030 B1 * | 5/2016 | Marr | G06F 9/5077 |
| 9,495,222 B1 * | 11/2016 | Jackson | G06F 11/3452 |

(Continued)

OTHER PUBLICATIONS

A Obeso Duque (Performance Prediction for Enabling Intelligent Resource Management on Big Data Processing Workflows) 2018—diva-portal.org (Year: 2018).*

(Continued)

*Primary Examiner* — Hafiz A Kassim
(74) *Attorney, Agent, or Firm* — Harrity & Harrity, LLP

(57) ABSTRACT

Resource parity scaling includes receiving in real time a plurality of machine-generated input signals from a computer network, the machine-generated signals generated during simultaneous real-time executions of multiple processes using human and compute resources. Based on analyzing the plurality of machine-generated signals, a performance level of each process is determined. The performance level of each process is compared with one or more predetermined key performance indicator (KPI) metrics corresponding to each process. Responsive to the comparing different combinations of the human and compute resources are allocated for performing different ones of the multiple processes. The allocating is based on resource-specific incremental conversion factors corresponding to the compute and human resources. One or more output signals are conveyed to the computer network indicating the different combinations.

20 Claims, 5 Drawing Sheets

(56) References Cited

U.S. PATENT DOCUMENTS

| | | | |
|---|---|---|---|
| 9,584,374 | B2 | 2/2017 | Bingham et al. |
| 10,572,650 | B2 | 2/2020 | Cooper et al. |
| 10,592,828 | B2 | 3/2020 | Farooq et al. |
| 10,680,914 | B1 | 6/2020 | Bingham et al. |
| 10,911,346 | B1 | 2/2021 | Choudhary et al. |
| 11,023,508 | B2 | 6/2021 | Fletcher et al. |
| 11,372,705 | B1* | 6/2022 | Minarik .............. G06F 11/3409 |
| 2005/0256946 | A1* | 11/2005 | Childress ............. G06Q 10/06 709/223 |
| 2006/0095917 | A1* | 5/2006 | Black-Ziegelbein ....................... G06F 9/5061 718/104 |
| 2008/0154660 | A1* | 6/2008 | Steinbach ............. G06Q 10/06 705/7.11 |
| 2008/0228857 | A1* | 9/2008 | Ostertag ............ G06Q 30/0251 709/201 |
| 2009/0192844 | A1* | 7/2009 | Ramkumar ........... G06Q 10/06 705/7.15 |
| 2009/0271472 | A1* | 10/2009 | Scheifler ................ H04L 41/18 709/202 |
| 2012/0303816 | A1* | 11/2012 | Kannan ..................... G06F 9/50 709/226 |
| 2014/0068075 | A1* | 3/2014 | Bonilla ................... H04L 41/12 709/226 |
| 2015/0143367 | A1* | 5/2015 | Jia ....................... G06F 9/45558 718/1 |
| 2016/0050222 | A1* | 2/2016 | Lyer ................... H04L 43/0876 726/1 |
| 2016/0254943 | A1* | 9/2016 | Maes ..................... G06F 16/11 709/224 |
| 2016/0295019 | A1* | 10/2016 | O'Connor ............ H04M 3/5175 |
| 2017/0249193 | A1* | 8/2017 | Brech ................. H04L 43/0805 |
| 2017/0353361 | A1* | 12/2017 | Chopra ............... H04L 41/0897 |
| 2017/0364391 | A1* | 12/2017 | Poghosyan ............ G06F 9/5027 |
| 2018/0068245 | A1* | 3/2018 | Conti .................. G06F 11/3692 |
| 2018/0109469 | A1* | 4/2018 | Nakazawa .......... H04L 43/0888 |
| 2019/0034242 | A1* | 1/2019 | Nutter ................... G06F 9/5055 |
| 2019/0149617 | A1* | 5/2019 | Gao ......................... H04L 67/34 709/223 |
| 2021/0176189 | A1* | 6/2021 | Rabipour ................ G06F 9/505 |

OTHER PUBLICATIONS

Wang, Y. et al., "Multiobjective optimization and hybrid evolutionary algorithm to solve constrained optimization problems," IEEE Transactions on Systems, Man, and Cybernetics, Part B (Cybernetics), Jun. 2007, vol. 37, No. 3, pp. 560-575.

Haralick, R.M. et al., "Increasing tree search efficiency for constraint satisfaction problems," Artificial intelligence, Oct. 1, 1980, vol. 14, No. 3, pp. 263-313.

Ganaie, M.A. et al., "Ensemble deep learning: A review," Engineering Applications of Artificial Intelligence, Oct. 1, 2022, vol. 115, No. 105151, [arXiv:2104.02395v3, Aug. 8, 2022], 47 pg.

Wang, F et al., "An ensemble learning based prediction strategy for dynamic multi-objective optimization," Applied Soft Computing, Nov. 1, 2020, vol. 96, No. 106592, 13 pg.

Liu, R et al., "A novel cooperative coevolutionary dynamic multi-objective optimization algorithm using a new predictive model," Soft Computing, Oct. 2014, vol. 18, pp. 1913-1929.

"IBM Process Mining," IBM Automation, Sep. 2022, IBM Corporation © 2022, 4 pg.

"SPSS Software," [online] IBM Corporation, [retrieved Sep. 28, 2022], retrieved from the Internet: <https://www.ibm.com/analytics/spss-statistics-software>, 8 pg.

"Workforce Planning," [online] IBM Corp. [retrieved Sep. 28, 2022], retrieved from the Internet: <https://www.ibm.com/analytics/workforce-planning>, 9 pg.

"IBM Process Mining,"[online] IBM Corp. updated Jun. 29, 2022, retrieved from the Internet: <https://www.ibm.com/docs/en/cloud-paks/1.0?topic=foundation-process-mining>, 2 pg.

"Key Performance Indicators (KPIs)," [online] IBM Corp., updated Jan. 10, 2022, retrieved from the Internet: <https://www.ibm.com/docs/en/supply-chain-insight?topic=concepts-key-performance-indicators-kpis>, 5 pg.

Mell, P. et al., The NIST Definition of Cloud Computing, National Institute of Standards and Technology, U.S. Dept. of Commerce, Special Publication 800-145, Sep. 2011, 7 pg.

Staniszkis, Witold, "Modelling Business Process Performance," Business process and services computing—1st international working conference on business process and services computing—BPSC 2007, Gesellschaft für Informatik e. V., 2007, 15 pg.

Wetzstein, Branimir et al., "Towards Management of SLA-Aware Business Processes Based on Key Performance Indicators," 9th Workshop on Business Process Modeling, Development and Support (BPMDS'08)—Business Process Life-Cycle: Design, Deployment, Operation & Evaluation, 2008, 10 pg.

Van Midden, Y., "Using process mining and event log analysis for better business strategy decision-making," [online] Bachelor's Thesis, University of Twente, 2021, retrieved from the Internet: <http://essay.utwente.nl/87378/1/Van_Midden_BA_EEMCS.pdf>, 9 pg.

Kamala, B. et al., "Process Mining and Deep Neural Network approach for the Prediction of Business Process Outcome", 2022 International Conference on Communication, Computing and Internet of Things (IC3IoT), 2022, pp. 1-4 (Abstract only).

* cited by examiner

RESOURCE PARITY SCALING USING KEY PERFORMANCE INDICATOR METRICS

BACKGROUND

This disclosure relates to implementing computer-supported processes using different types of resources, and, more particularly, to enhancing the performance of such processes using machine-generated data and key performance indicator (KPI) metrics.

Enterprises of various types and sizes often perform multi-step processes using a varied mix of resources, both human- and machine-based. The determination of how well a given process is being, or has been, performed is typically made using a variety of KPIs. An enterprise may use KPI metrics, for example, to assess how efficiently the enterprise performs a process. A service level agreement (SLA) between an enterprise and a client, for example, may incorporate one or more KPIs that the enterprise must meet in performing process-related services for the client. Although KPIs enable an enterprise to assess process performance, KPIs, in and of themselves, typically do not provide the enterprise with insights into how to improve the performance of a process. KPIs alone thus often do not enable the enterprise to address process-related problems, capture possible gains, or enhance efficiency.

SUMMARY

In one or more embodiments, a method includes receiving in real time a plurality of machine-generated input signals from a computer network, the machine-generated input signals generated during simultaneous real-time executions of multiple processes using human and compute resources. The method includes determining, based on analyzing the plurality of machine-generated signals, a performance level of each process. The method includes comparing the performance level of each process with one or more predetermined key performance indicator (KPI) metrics corresponding to each process. The method includes allocating, in response to the comparing, different combinations of the human and compute resources for performing different ones of the multiple processes. The allocating is based on resource-specific incremental conversion factors corresponding to the compute and human resources. The method includes conveying to the computer network at least one output signal indicating the different combinations. In one aspect, with respect to each process a trend in the performance level of the process is determined based on monitoring process performance levels over time. Based on the trend, the likelihood that a process upon completion fails to conform to a specific KPI is predicted. The prediction can be performed using a machine learning prediction model. In response to the likelihood exceeding a predetermined threshold, a reallocation of the human and compute resources is determined to reduce the likelihood.

In another aspect, the KPI metrics are based on KPIs associated with a service level agreement (SLA). An optimization is performed based on the resource-specific incremental conversion factors given the KPIs associated with the SLA. Different combinations of the human and compute resources are allocated based on the optimization, such that the different combinations are likely to enable the multiple processes to conform to the KPIs associated with the SLA.

In another aspect, one or more signals are conveyed to a staffing system and/or an auto-orchestration system. An automatic allocation of human resources can be performed by the staffing system and/or an automatic allocation of compute resources can be performed by the auto-orchestration system.

In another aspect, each resource-specific incremental conversion factor is derived from process mining human resource and compute resource data generated by prior executions of the multiple processes.

In another aspect, the performance of the multiple processes is monitored and a post-completion report generated. The post-completion report includes an indication of whether one or more of the multiple processes failed to align a specific KPI. The KPI can be specified by an SLA.

In another aspect, the feature descriptors are generated using a dense scale invariant feature transformer algorithm.

In one or more embodiments, a system includes a processor configured to initiate executable operations as described within this disclosure.

In one or more embodiments, a computer program product includes one or more computer readable storage mediums having program code stored thereon. The program code is executable by a processor to initiate executable operations as described within this disclosure.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

Figure 1:
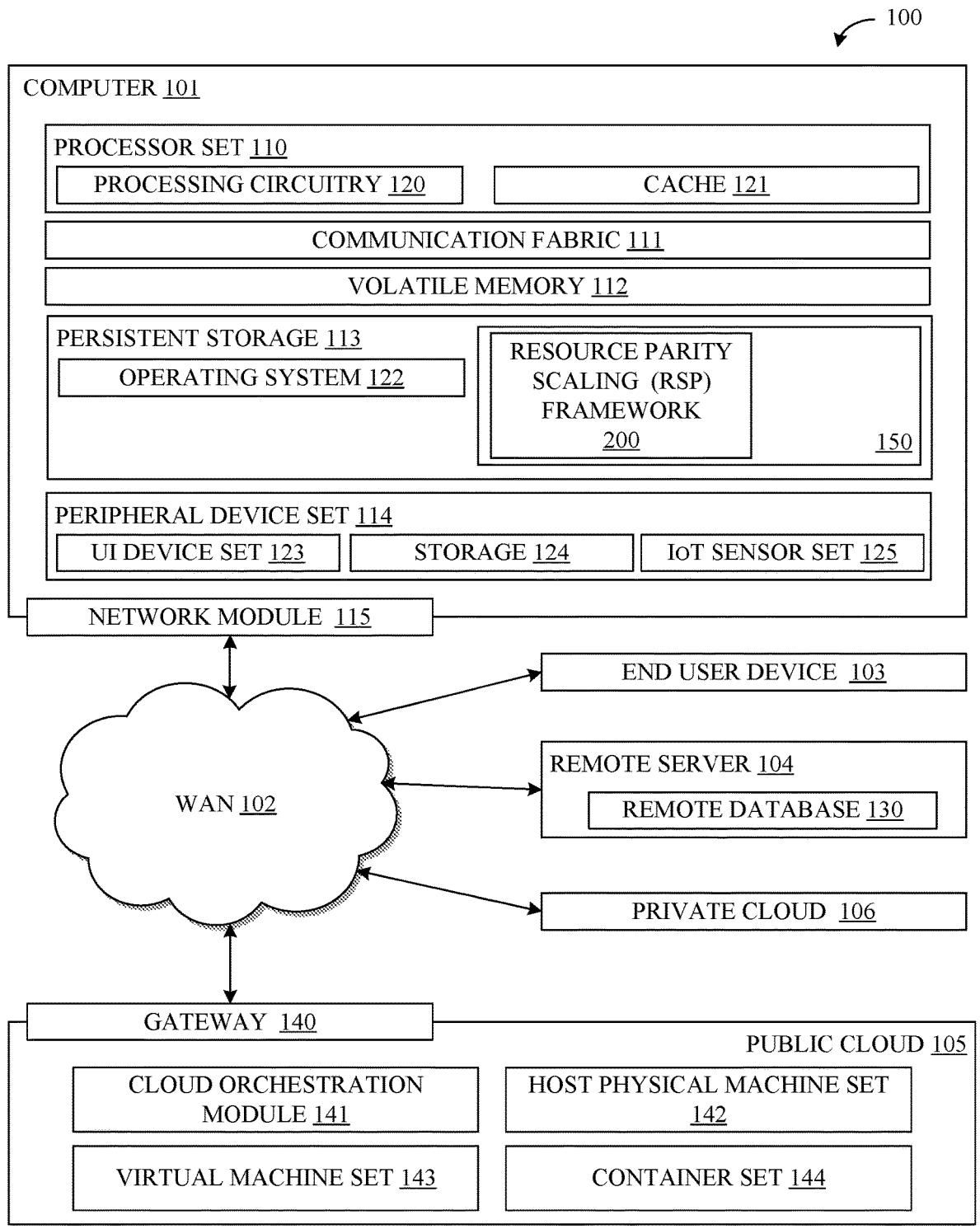
FIG. 1 illustrates an example of a computing environment that is capable of implementing a resource parity scaling (RPS) framework.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to implementing computer-supported processes using different types of resources, and, more particularly, to enhancing the performance of such processes using machine-generated data and key performance indicator (KPI) metrics. In accordance with the inventive arrangements described herein, methods, systems, and computer program products are provided that are capable of reallocating, in real time, available human and compute resources to multiple computer-supported processes to enhance processing efficiency with respect to one or more KPIs. The allocation is based on a novel set of incremental conversion factors. As defined herein, an "incremental conversion factor" is a quantifiable measure of the incremental change in performance of a process task owing to adding to, or removing from, the task a resource. The incremental change can be measured relative to a mean, median, or other statistical measure of performance of the task using other resources of the same type.

An incremental conversion factor for a human resource, such as a particular team or team member, for example, may be the reduced (or additional) time needed to complete a process task relative to the time required with other teams or team members. The incremental conversion factor for a compute resource, for example, may be the increased (or diminished) data throughput, memory usage, or processing time relative to other compute resources for performing a certain compute task of a process. The incremental conversion factor of a specific resource (human or compute) with respect to a particular process task can be derived by performing process mining and/or task mining performed on a collection of process executions collected over a span of time.

In one aspect, the incremental conversion factors can be used for allocating a finite set of human and compute resources available for performing multiple processes (each involving multiple tasks) simultaneously, or nearly so, to enhance or potentially optimize performance of one or more of the processes. Performance of a process can be measured, for example, as the time needed to complete the process, the number of errors occurring during execution, or other such quantifiable measure.

In another aspect, the incremental conversion factors can be used for reallocating, in real time, resources among multiple executing processes to prevent one or more process from failing to meet a certain level of performance. If the performance of one process lags an average or required level of performance, then a reallocation of one or more resources to a critical task for completing the process may ameliorate the situation or at least reduce the likelihood that the process will not be completed as desired. Given the finiteness of the resources available, however, the shift of a more efficient resource to the critical task may adversely affect the performance a task related to a different process. That is, a resource reallocation that improves the situation for one process, may jeopardize the likely successful performance of another process. The incremental conversion factors can be used to quantify the effects of an allocation or reallocation of resources. The incremental conversion factors enable a reallocation that achieves a parity scaling by shifting resources among tasks that provides the greatest increase in likelihood of success while minimizing the probability of failure of the processes as a whole. Thus, the incremental conversion factors can serve as parameters for optimizing the allocation of a finite set of human and compute resources among the tasks of overlapping processes performed in near time to one another. The reallocation can be determined in real time.

The incremental conversion factors can be utilized to ensure, or at least maximize a likelihood, that certain KPIs related to multiple processes are met. The KPIs can be used to determine a reallocation of resources among multiple processes executing in real time. That is, certain processes may take precedence over others or have a greater priority. Utilizing the incremental conversion factors, one or more human and/or compute resources can be reallocated to meet the KPI(s) associated with a high priority process even though other KPIs associated with low priority processes may not be met. Thus, the KPIs, used in conjunction with the incremental conversion factors, can be used to guide the reallocation of resources among multiple processes executing in real time. In certain arrangements, the KPIs for a process can be specified by a service level agreement (SLA) between an enterprise and a client. In one aspect, therefore, KPIs that guide a reallocation of resources based on the incremental conversion factors can be determined based on one or more SLAs that prioritize multiple processes.

Further aspects of the inventive arrangements are described below with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, computing environment 100 contains an example of an environment for the execution of at least some of the computer code in block 150 involved in performing the inventive methods, such as resource parity scaling (RPS) framework 200 implemented as executable program code or instructions. RPS framework 200 is capable of performing machine learning classifications based on unseen as well as seen attributes of objects. By comparison, some conventional machine learning methodologies and algorithms (e.g., ZSL, GZSL) assume that all attributes are seen during the training of a machine learning classifier model. While such methodologies and algorithms can classify unseen classes, the methodologies and algorithms assume that all attributes that are seen for unseen classes are also seen with at least some seen classes. RPS framework 200 utilizes an entropy-based penalty in training a machine learning model. In contrast to conventional techniques, RPS framework 200 applies the entropy-based penalty in the attribute domain rather than at the class level. RPS framework 200 can be extended to handle dataset imbalances as well as predict unseen attributes. Applying the entropy-based penalty also lessens the problem of overfitting a machine learning model.

Computing environment 100 additionally includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and RPS framework 200, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (e.g., secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (e.g., a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (e.g., private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
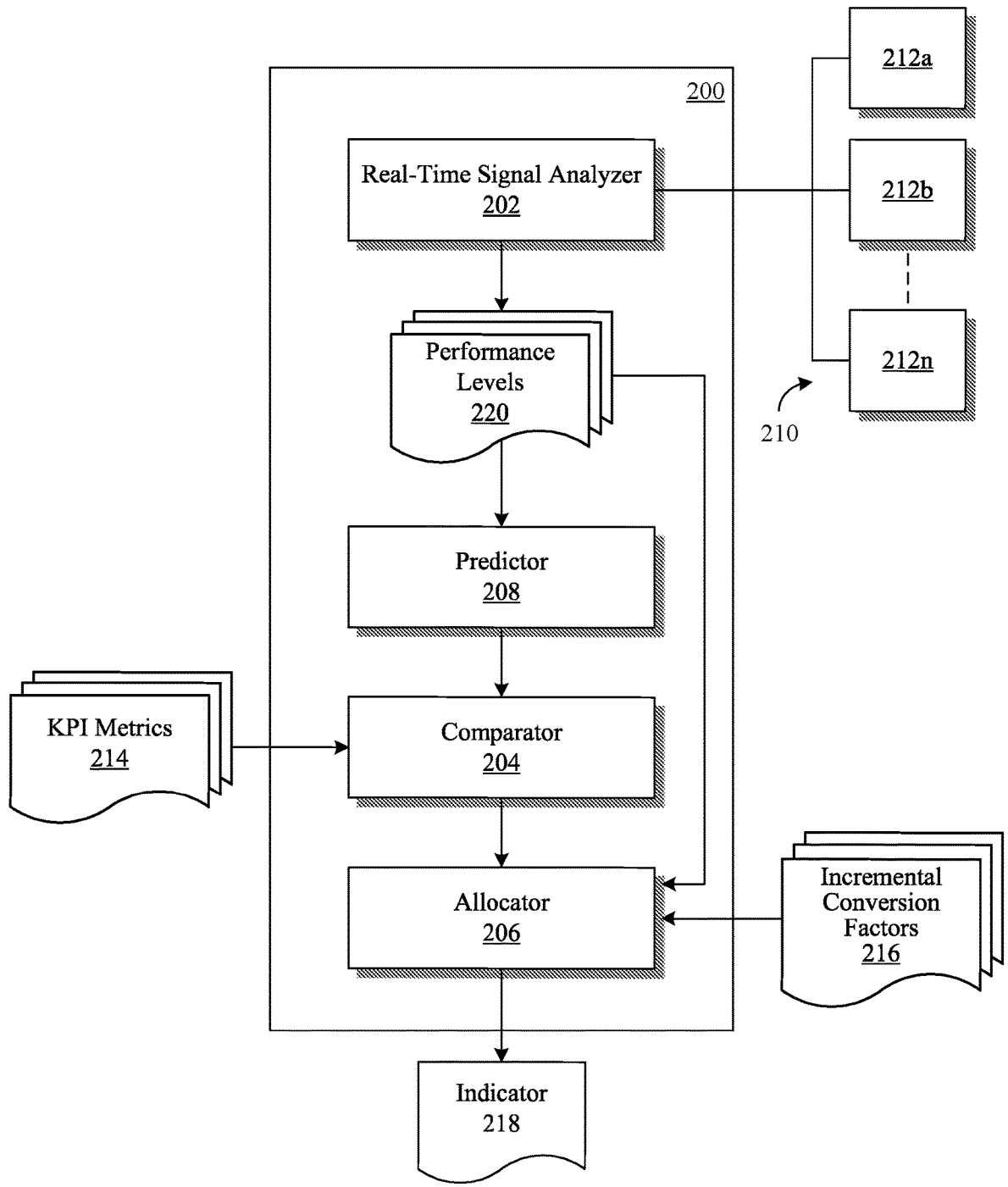
FIG. 2 illustrates an example architecture for the framework of FIG. 1.

FIG. 2 illustrates an example architecture for the executable RPS framework 200 of FIG. 1. In the example of FIG. 2, RPS framework 200 includes real-time signal analyzer 202, comparator 204, and allocator 206. Optionally, RPS framework includes predictor 208.

Figure 3:
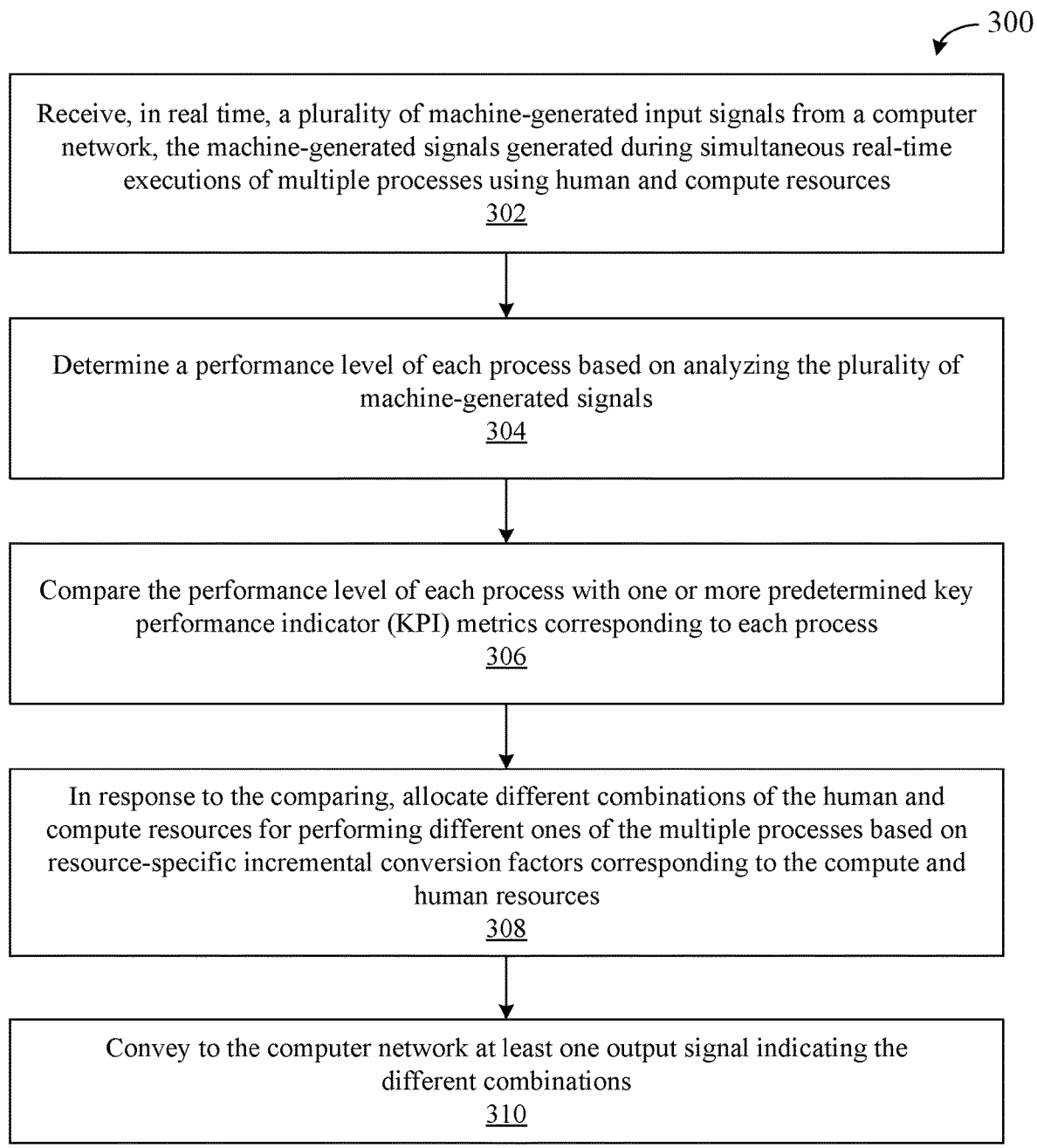
FIG. 3 illustrates an example method of operation of the framework of FIGS. 1 and 2.

FIG. 3 illustrates an example method 300 of operation of the RPS framework 200 of FIGS. 1 and 2. Referring to FIGS. 2 and 3 collectively, in block 302, real-time signal analyzer 202 receives a plurality of machine-generated input signals from computer network 210, which illustratively includes n example computing devices 212a, 212b, and 212n, such as networked servers, desktop computers, mobile devices, and the like. Computer network 210 can be an enterprise network for supporting the enterprise's performing multiple processes. Computing devices 210a-210n generate signals as part of the computer-based procedures executed as part of the multiple processes performed using human and compute resources.

In block 304, real-time signal analyzer 202 determines performance levels 220 for the multiple processes. Real-time signal analyzer 202 is capable of determining a performance level for each of the processes based on analyzing a plurality of machine-generated signals received from all or some combination of the n example computing devices 210a, 210b, and 210n. For example, in the context of a call center's processing calls, real-time signal analyzer 202 can determine from the signals which individuals or team are answering calls, the average time taken to respond, and other human resource tasks performed in real time. With respect to compute resources, in the same context, the real-time signal analyzer 202 can determine compute resource activities such as memory usage, CPU usage, server geo-locations, processing time, and other compute resource performance measures. Compute resource performance measures can be derived from the real-time execution of computer procedures executed for performing a process, such as processing calls by a call center.

In block 306, comparator 204 compares the performance level of each process with one or more predetermined KPI metrics 214 that correspond to each of the multiple processes. In some arrangements, the KPI metrics are based on KPIs specified by an SLA. An SLA-specified KPI applies to specific processes performed subject to the terms of the SLA. One or more SLAs can determine a level of priority of all or only some of the multiple processes performed. A KPI specifies the level of performance for a specific process. The performance level can vary at any point owing to the performance of a particular process task. Optimally, the performance of a process-specific task is aligned with, or exceeds, that specified by an applicable KPI. The comparison by comparator 204 can indicate whether the current performance level of the task varies—either exceeding or lagging—the performance specified by the specific KPI. The variation can be due to the performance of a specific human resource (e.g., a team or individual) and/or a particular compute resource.

In block 308, allocator 206, based on the comparing, allocates different combinations of the human and compute resources for performing different ones of the multiple processes. Allocator 206 determines an optimal, or most likely optimal, allocation based on resource-specific incremental conversion factors 216 corresponding to the compute and human resources. Each of incremental conversion factors 216 can indicate a marginal or incremental impact of taking a resource away from performing a task of one process and using it to perform a task of a different process. The tradeoffs arising from shifting human and compute resources from one process to another can be used to determine an allocation that is most likely to optimize a certain objective. One objective may be to ensure that each process is likely, given the finite amount of human and compute resources available, to meet a predetermined set of KPIs for each process. Another objective may be to allocate the resources to achieve a greatest likelihood that the KPIs associated with certain high priority processes are met. Allocator 206, in different embodiments, can implement different optimization approaches to allocating resources to meet different objectives, as described in greater detail below.

In block 310, upon determining an allocation of the human and compute resources, allocator 206 conveys one or more signals to one or more of n example computing devices 210a-210n of computer network 210. The signal(s) can convey indicator 218, which indicates the different combination of human and compute resources dictated by the allocation determined by allocator 206.

A process' performance level can vary over time during execution of the process. In certain embodiments, comparator 204 is capable of determining performance levels 220 for each of the multiple processes continuously or intermittently as the processes are executing and monitored by RPS 200 framework. Accordingly, the on-going comparing by comparator 204 enables RPS framework 200 to determine at a given instant whether—given a current level of performance—a process is likely to fail in meeting or conforming to a specific KPI.

Figure 4:
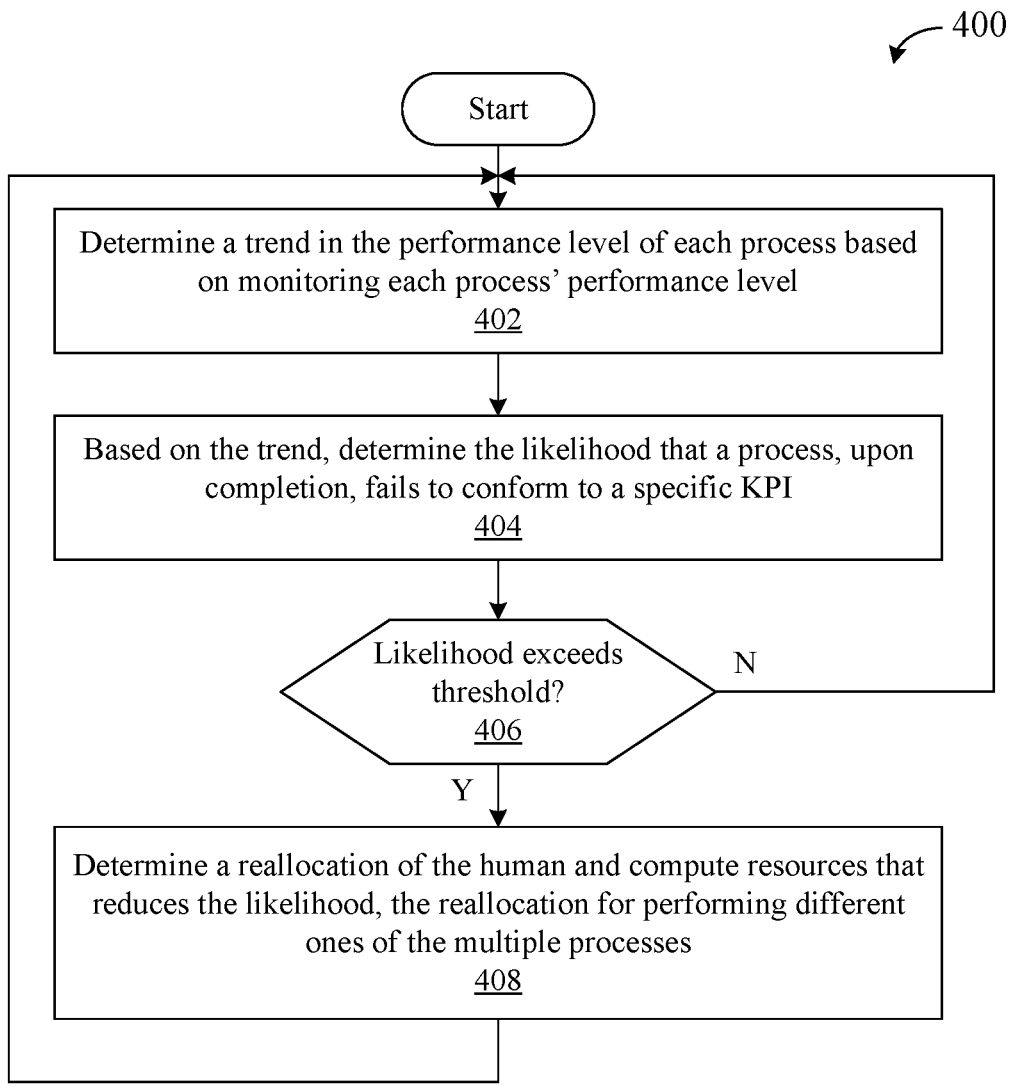
FIG. 4 illustrates another example method of operation of the framework of FIGS. 1 and 2.

Referring additionally to FIG. 4, an example method 400 is illustrated according to which RPS framework 200 predicts whether a process is likely to fail to meet a KPI and responds in way that ameliorates the likelihood.

At block 402, for each process, predictor 208 determines a trend in the performance level of the process based on monitoring the process' performance levels during execution of the process. The trend, in certain embodiments, is determined by predictor 208 performing an analysis of a time series generated by the real-time monitoring of process levels during execution of the process.

At block 404, based on the trend, predictor 208 determines the likelihood that a process will not meet a specific KPI upon completion of the process' execution. In certain embodiments, predictor 208 is configured to implement a machine learning prediction model (e.g., linear or non-linear regression), which is used to generate a predication based on the time series.

If, at block 406, the likelihood exceeds a predetermined threshold, then at block 408 allocator 206 determines a reallocation of the human and/or compute resources. The reallocation of the human and compute resource used in performing different ones of the multiple processes reduces the likelihood that the process fails to conform to the KPI. In some embodiments, the reallocation is determined as a constrained maximization $$\max_{\Delta r_i} F(\Delta r_1, \Delta r_2, \ldots, \Delta r_n)$$

subject to $$r_1 \le a_1, r_2 \le a_2, \ldots, r_n \le a_n,$$

where $F(\Delta r_1, \Delta r_2, \ldots, \Delta r_n)$ is a vector or scalar objective function, $\Delta r_i$ is the incremental conversion factor of the i-th resource, and $\alpha_i$ is the available quantity of the i-th resource (human or compute).

For example, the constrained optimization, in some embodiments, can optimize the likelihood that each process meets one or more KPIs associated with the process. In other embodiments, for example, the constrained optimization can optimize a likelihood that certain processes have specified priority are optimized. In each embodiment, the optimization function may change depending on a desired objective of the allocation or reallocation. Every such function, however, relies on the marginal or incremental impact of a resource on a process as quantified by the resource's corresponding incremental conversion factor. The imposed constraints are the available quantities of human and compute resources, but can also include other constraints, such as prioritization of certain processes.

In some embodiments, KPI metrics 214 are based on KPIs associated with a service level agreement (SLA). Accordingly, a constrained optimization can be performed based on the resource-specific incremental conversion factors given the KPIs associated with the SLA. The optimization performed determines the allocation of the human and compute resources based on the optimization. The optimization is such that the different combinations of resources allocated to the multiple processes are likely to enable the multiple processes to conform to the KPIs associated with the SLA.

Allocator 206, in certain embodiments, implements a machine learning model to determine a reallocation that is most likely to meet a specific objective. The machine learning model can be one that learns through supervised learning, the training examples being the outcomes of process executions using different resource combinations. Using the machine learning model, allocator 206 can identify an allocation having the greatest likelihood of meeting a specified objective given the specific resources and their quantities for performing each of the processes.

Figure 5:
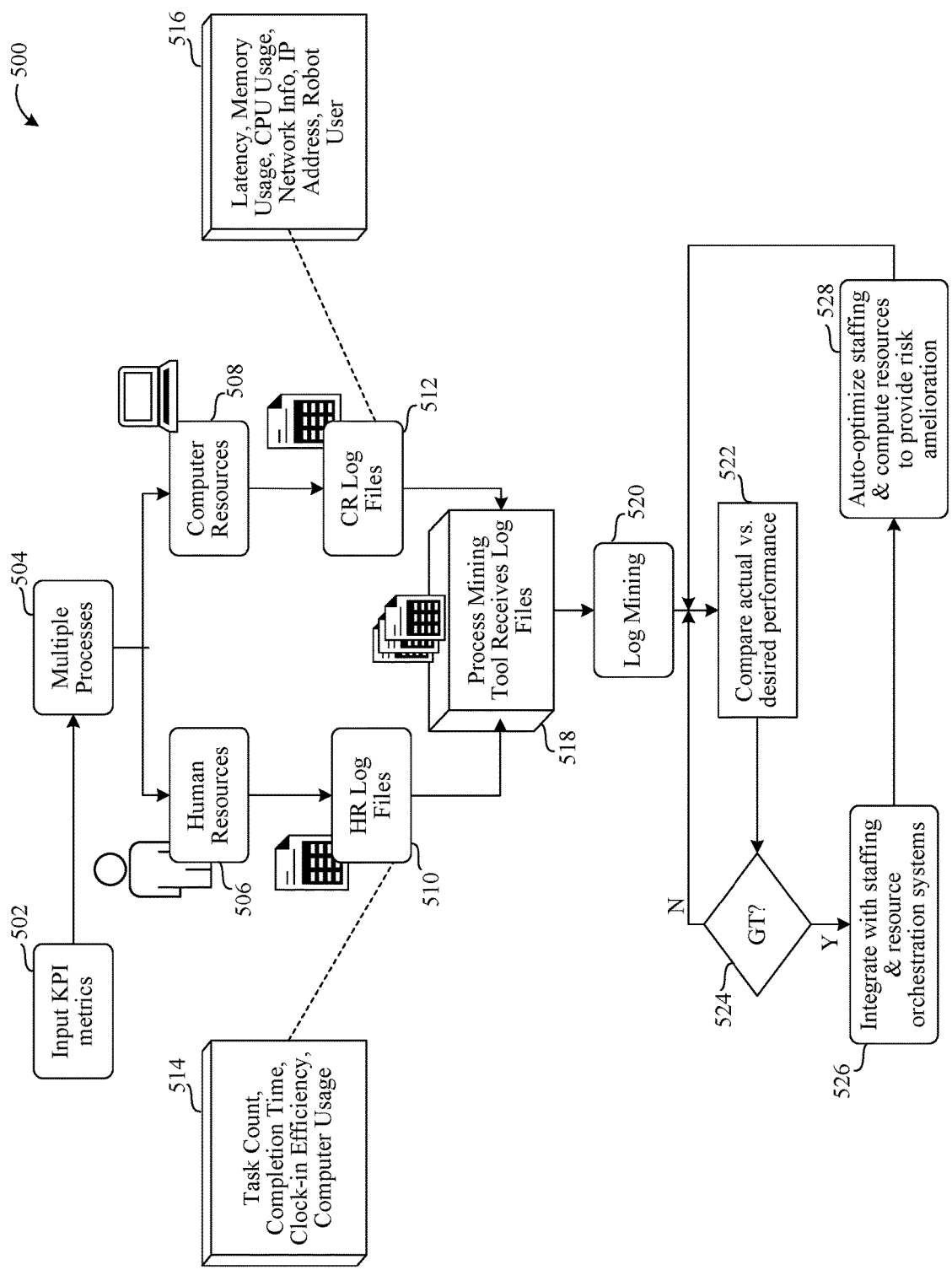
FIG. 5 illustrates certain operative aspects of an example embodiment of the framework of FIG. 1.

Referring jointly now to FIGS. 2 and 5 certain operative aspects of RPS framework 200 are illustrated. Initially, at block 502, KPIs and corresponding metrics are input and assigned to multiple processes 504, each of which is performed using various combinations of human resources 506 and compute resources 508. The KPIs and corresponding metrics can be introduced via a dashboard or reporting system with network connectors and can be automatically encoded in a data structure for processing. In some arrangements, the data structure uses a combination of name, value, and period for encoding the KPIs and corresponding metrics. An event log analysis, by a process mining tool (not explicitly shown) can identify key works and data fields corresponding to the KPIs and related metrics.

Prior to RPS framework 200's real-time monitoring and allocation of human resources 506 and compute resources 508, event logs 510 and event logs 512 generated/derived from data generated by n computing devices 210a-210n are analyzed by the process mining tool. Optionally, one or more task mining tools (not shown), additionally or alternatively, can be utilized for generating log files. Event logs 510 and event logs 512 can be derived from prior executions of multiple processes 504. Event logs 510 include process events 514 related to usage and performance of human resources 506, such as task count, individual or team completion times, clock-in efficiency, computer usage (e.g., user mouse behavior), and the like. Event logs 510 can include workflow and user interface log files, the data of which are related to human resource 506 usage and performance. Data related to human resource usage and performance also can be derived from client-side web Logs, user-access logs, for example, as well as general logs. In some embodiments, natural language processing (NLP) extracts from event logs 510 text indicative of human resource usage and performance. Event logs 512 include process events 516 related to usage and performance of compute resources 508, such as latency, memory usage, CPU usage, network information, IP addresses, and the like. Event logs 512 can include container logs, Kubernetes® logs, and system performance analysis logs, as well as general logs. In some arrangements, NLP extracts from event logs 512 text indicative of compute resource usage and performance.

The process mining tool, at block 518 receives event logs 510 and event logs 512. At block 520, the process mining tool performs log mining. The process mining tool can perform a log alignment analysis of event logs 510 and event logs 512. The log alignment analysis parses data from event logs 510 and event logs 512 to obtain key words and/or other features pertaining to the usage and performance of human resources 506 and compute resources 508. The key words and/or other features also can be associated with network devices. In certain embodiments, the log mining at block 520 includes executing deep learning and inspection to derive each resource of a specific type (human or compute) and simulate its impact during the execution of multiple processes 504. The deep learning and inspection can generate metrics corresponding to the impact of each resource on the KPIs. The impact determined for a resource can determine the resource's incremental conversion factor.

At block 522, RPS framework 200 utilizes incremental conversion factors determined with respect to human resources 506 and compute resources 508. Specifically, during real-time execution of multiple processes 504, RPS framework 200 determines whether upon its completion a specific process is likely to fail to meet an associated KPI. As described above, based on the incremental conversion factors, RPS framework 200 responds to a likelihood of failure by reallocating one or more of human resources 506 and/or compute resources to reduce or eliminate the likelihood.

In certain embodiments, at block 526, RPS framework 200 integrates with a staffing system and/or computer orchestration system. At block 528, in response to a signal indicating a reallocation determined by RPS framework 200, the staffing system and/or computer orchestration system, respectively, reallocates one or more of human resources 506 and/or compute resources 508 to reduce or eliminate the likelihood of a process' failing to meet a specific KPI.

Optionally, RPS framework 200, based on monitoring the execution of multiple processes 504, can generate a post-completion report after execution of the processes. The post-completion report can include an indication of whether one or more of multiple processes 504 failed upon completion to meet or align with one or more KPIs. If the one or more KPIs are specified by an SLA, the post-completion report can indicate which, if any, process failed to meet or comply with an SLA-specified KPI.

An example application of RPS framework 200 is the real-time allocation of human and compute resources in the context an enterprise's customer support system. Computer system 210, for example, can execute multiple customer support processes for performing various functions. The plurality of customer support processes can include, for example, an online product ordering process that enables a customer to search for and place an order to purchase a product. Another process, for example, can support a customer's return of the product for some reason. For a product return, the customer may be required to submit answers to a form, and depending on the customer's answers, the customer may be redirected to yet another process.

Consider two such customer support processes, p1 and p2, corresponding to the initial customer return process and the customer-redirect process, respectively. Assume, for example, that KPI1 is the average wait time for customer to connected to a customer support specialist, which is less than 3 minutes. If an aspect of p1 is the connecting of a customer to a customer support specialist, then the average wait time for the connecting can contribute to KPI1 and factored in with other input metrics in determining the value of KPI1. Depending on one or more human resource incremental conversion factors, if 5 employees are allocated from process p2 to process p1, then the average wait time is decreased, say, by 1.2 minutes. Correspondingly, given the incremental conversion factors, average wait time associated with process p2 may increase by 1.4 minutes. An employee-specific incremental conversion factor may be such that, if that specific employee is reallocated from process from p2 to process p1, then the average wait time associated with p2 may increase by 60.3 percent.

Another incremental conversion factor may pertain to the number of calls handled as a function of the location of the resources handling the call. For example, if 20 percent of the online customer interactions are redirected to a North American cluster of human and compute resources (e.g., computing devices 212a-212n), then in accordance with the incremental conversion factor, the maximum number of requests processed per second may increase to 2500.

Given the various incremental conversion factors, consider an example situation in which, owing to an overload of one or more servers, there is an influx of customer returns involving process p1 that are routed to the North American cluster. As a result, the average wait time for a customer increases. Without the capabilities provided by RPS framework 200, it is likely not only that there is no real-time alert that the enterprise is likely to fail to meet one or more KPIs, but also that the missed KPIs are not reviewed or analyzed until well after the overload subsides. During the event itself, however, it is likely that even if customers are explicitly notified of the delay, they will have no other recourse than to wait until the situation is resolved—which, without a real-time reallocation of resources may take considerable time to resolve.

RPS framework 200 is capable of mitigating the effects of the situation in real time through the real-time reallocation of human and compute resources. Real-time signal analyzer 202 detects signals that, in real time, indicate the increase in traffic. Comparator 204 can compare the rate that return calls are currently being processed with one or more KPIs, such as KPI1. Allocator 206 can respond to the situation by computing a feasible solution space (feasible reallocations) given various real-time constraints. For example, a constraint may be that process p2 requires a minimum of 5 customer support specialists. A feasible reallocation is one that maps human and/or compute resources to optimize the likelihood of mitigating the effects of the overload without violating constraints such as the need to provide a minimum of 5 customer support specialists to process p2. Given the likely breadth of the feasible solution space allocator 206 can implement any of the various types of constrained optimization procedures described above to determine a reallocation best suited to the overload situation.

For example, the feasible reallocation may reallocate 3 employees from process p2 to process p1 and two other employees from a third process p3 to process p1. Given the incremental conversion factor, above, if 5 employees are allocated to process p1, then the average wait time of p1 is decreased by 1.2 minutes. The constrained optimization model can factor in this incremental conversion factor along with one or more others. Optionally, predictor 208 can predict the effect on average wait times corresponding to processes p1, p2, and p3. RPS framework 200 thus can evaluate which KPIs will be met, potentially weighting the different KPIs based, for example, on priorities established by one or more SLAs. Different reallocations analyzed by RSP framework 200 converge to an optimal or near-optimal solution for mitigating the overload situation. For example, an optimal solution may map three specific employees to process p1 and route 15 percent of the customer return calls to the North American cluster.

The outcome of the reallocation can be represented as a delta indicating, for example, that the average wait time corresponding to process p1 will decrease by 0.8 minutes if the solution is implemented, while the average wait time corresponding to process p2 will increase by 0.6 minutes, and the average wait time corresponding to process p3 will increase by 0.3 minutes. Indicator 218 generated by allocator 206 can provide the mappings of the optimal reallocation to a staffing system and/or an auto-orchestration system for reallocating resources. For example, with respect to both the staffing system and auto-orchestration system, employee IDs and new process IDs from the mapping are passed. New configurations for routing traffic from the mapping can be passed, for example, to the appropriate load balancers or the like. After RPS framework 200 has determined an optimal, or near-optimal, reallocation and the resulting allocations have been made, RPS framework 200 can update the various incremental conversion factors to reflect actual changes that occurred as a result of the machine-determined reallocation.

The terminology used herein is for the purpose of describing particular embodiments only and is not intended to be limiting. Notwithstanding, several definitions that apply throughout this document now will be presented.

The term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B and C." "at least one of A, B, or C." "one or more of A, B, and C." "one or more of A, B, or C." and "A, B, and/or C" means A alone, B alone, C alone, A and B together, A and C together, B and C together, or A, B and C together.

As defined herein, the term "automatically" means without user intervention.

As defined herein, the terms "includes," "including." "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "processor" means at least one hardware circuit configured to carry out instructions. The instructions may be contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, when a second action is performed "responsive to" a first action, there is a causal relationship between an occurrence of the first action and an occurrence of the second action. The term "responsive to" indicates the causal relationship.

As defined herein, the term "team" means a collection of individuals, and relatedly, the term "individual," as defined herein, means a human being. The term, "user" as defined herein means a human being.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   receiving in real time, by a processor, a plurality of machine-generated input signals from a computer network, wherein the plurality of machine-generated input signals are generated during simultaneous real-time executions of multiple processes using human and compute resources;
   determining, based on analyzing the plurality of machine-generated input signals by the processor, a performance level of each process of the multiple processes;
   comparing, by the processor, the performance level of each process with one or more predetermined key performance indicator (KPI) metrics corresponding to each process;
   allocating, by the processor, in response to the comparing, different combinations of the human and compute resources for performing different ones of the multiple processes, wherein the allocating is based on resource-specific incremental conversion factors corresponding to the human and compute resources, and wherein the resource-specific incremental conversion factors are measures of change in the performance level of each process owing to adding to each process or removing from each process, the human and compute resources; and
   conveying, by the processor, to the computer network, at least one output signal indicating the different combinations, wherein the conveying includes conveying the at least one output signal to an auto-orchestration system configured to automatically reallocate the computer resources, and automatically reallocating, by the auto-orchestration system, the compute resources, wherein the reallocation improves a performance of a call center, and wherein compute resource performance measures are derived from real-time execution of computer procedures executed for processing calls by the call center.

2. The method of claim 1, further comprising:
   determining for each process a trend in the performance level of the process based on monitoring the performance level over time;
   predicting, based on the trend, a likelihood that the process upon completion fails to conform to a specific KPI; and
   in response to the likelihood exceeding a predetermined threshold, determining a reallocation of the human and compute resources that reduces the likelihood of exceeding the predetermined threshold.

3. The method of claim 2, wherein the predicting is performed using a machine learning prediction model.

4. The method of claim 1, wherein the predetermined KPI metrics are based on KPIs associated with a service level agreement (SLA), and further comprising:
   performing an optimization based on the resource-specific incremental conversion factors given the KPIs associated with the SLA; and
   performing the allocating different combinations of the human and compute resources based on the optimization, wherein the different combinations enable the multiple processes to conform to the KPIs associated with the SLA.

5. The method of claim 1, wherein
   the multiple processes are performed within the call center.

6. The method of claim 1, wherein each resource-specific incremental conversion factor of the resource-specific incremental conversion factors is derived from process mining human resource and compute resource data generated by prior executions of the multiple processes.

7. The method of claim 1, further comprising:
monitoring performance of the multiple processes; and
generating a post-completion report, wherein the post-completion report includes an indication of whether one or more of the multiple processes failed to align with an SLA-specified KPI.

8. A system, comprising:
one or more processors configured to initiate operations including:
receiving in real time a plurality of machine-generated input signals from a computer network, wherein the plurality of machine-generated input signals are generated during simultaneous real-time executions of multiple processes using human and compute resources;
determining, based on analyzing the plurality of machine-generated input signals, a performance level of each process of the multiple processes;
comparing the performance level of each process with one or more predetermined key performance indicator (KPI) metrics corresponding to each process;
allocating, in response to the comparing, different combinations of the human and compute resources for performing different ones of the multiple processes, wherein the allocating is based on resource-specific incremental conversion factors corresponding to the human and compute resources, and wherein the resource-specific incremental conversion factors are measures of change in the performance level of each process owing to adding to each process or removing from each process, the human and compute resources; and
conveying to the computer network at least one output signal indicating the different combinations, wherein the conveying includes conveying the at least one output signal to an auto-orchestration system configured to automatically reallocate the computer resources, and automatically reallocating, by the auto-orchestration system, the compute resources, wherein the reallocation improves a performance of a call center, and wherein compute resource performance measures are derived from real-time execution of computer procedures executed for processing calls by the call center.

9. The system of claim 8, wherein the one or more processors are configured to initiate operations further including:
determining for each process a trend in the performance level of the process based on monitoring the performance level over time;
predicting, based on the trend, a likelihood that the process upon completion fails to conform to a specific KPI; and
in response to the likelihood exceeding a predetermined threshold, determining a reallocation of the human and compute resources that reduces the likelihood of exceeding the predetermined threshold.

10. The system of claim 8, wherein the predetermined KPI metrics are based on KPIs associated with a service level agreement (SLA), and wherein the one or more processors are configured to initiate operations further including:
performing an optimization based on the resource-specific incremental conversion factors given the KPIs associated with the SLA; and
performing the allocating different combinations of the human and compute resources based on the optimization, wherein the different combinations enable the multiple processes to conform to the KPIs associated with the SLA.

11. The system of claim 8, wherein
the multiple processes are performed within the call center.

12. The system of claim 8, wherein each resource-specific incremental conversion factor of the resource-specific incremental conversion factors is derived from process mining human resource and compute resource data generated by prior executions of the multiple processes.

13. The system of claim 8, wherein the one or more processors are configured to initiate operations further including:
monitoring performance of the multiple processes; and
generating a post-completion report, wherein the post-completion report includes an indication of whether one or more of the multiple processes failed to align with an SLA-specified KPI.

14. A computer program product, the computer program product comprising:
one or more computer-readable storage media and program instructions collectively stored on the one or more computer-readable storage media, the program instructions executable by one or more processors to cause the one or more processors to initiate operations including:
receiving in real time a plurality of machine-generated input signals from a computer network, wherein the plurality of machine-generated input signals are generated during simultaneous real-time executions of multiple processes using human and compute resources;
determining, based on analyzing the plurality of machine-generated input signals, a performance level of each process of the multiple processes;
comparing the performance level of each process with one or more predetermined key performance indicator (KPI) metrics corresponding to each process;
allocating, in response to the comparing, different combinations of the human and compute resources for performing different ones of the multiple processes, wherein the allocating is based on resource-specific incremental conversion factors corresponding to the human and compute resources, and wherein the resource-specific incremental conversion factors are measures of change in the performance level of each process owing to adding to each process or removing from each process, the human and compute resources; and
conveying to the computer network at least one output signal indicating the different combinations, wherein the conveying includes conveying the at least one output signal to an auto-orchestration system configured to automatically reallocate the computer resources, and automatically reallocating, by the auto-orchestration system, the compute resources, wherein the reallocation improves a performance of a call center, and wherein compute resource performance measures are derived from real-time execution of computer procedures executed for processing calls by the call center.

15. The computer program product of claim 14, wherein the one or more processors are configured to initiate operations further including:

determining for each process a trend in the performance level of the process based on monitoring the performance level over time;

predicting, based on the trend, a likelihood that the process upon completion fails to conform to a specific KPI; and in response to the likelihood exceeding a predetermined threshold, determining a reallocation of the human and compute resources that reduces the likelihood of exceeding the predetermined threshold.

16. The computer program product of claim 15, wherein the predicting is performed using a machine learning prediction model.

17. The computer program product of claim 14, wherein the predetermined KPI metrics are based on KPIs associated with a service level agreement (SLA), and wherein the one or more processors are configured to initiate operations further including:

performing an optimization based on the resource-specific incremental conversion factors given the KPIs associated with the SLA; and performing the allocating different combinations of the human and compute resources based on the optimization, wherein the different combinations enable the multiple processes to conform to the KPIs associated with the SLA.

18. The computer program product of claim 14, wherein the multiple processes are performed within the call center.

19. The computer program product of claim 14, wherein each resource-specific incremental conversion factor of the resource-specific incremental conversion factors is derived from process mining human resource and compute resource data by generated prior executions of the multiple processes.

20. The computer program product of claim 14, wherein the one or more processors are configured to initiate operations further including:

monitoring performance of the multiple processes; and generating a post-completion report, wherein the post-completion report includes an indication of whether one or more of the multiple processes failed to align with an SLA-specified KPI.

* * * * *